United States Patent [19]

Hsiesh

[11] Patent Number: 5,705,901
[45] Date of Patent: Jan. 6, 1998

[54] MICROPROCESSOR-CONTROLLED SCREEN VOLTAGE GENERATION CIRCUIT

[75] Inventor: Chang-Fa Hsiesh, Kweishan, Taiwan

[73] Assignee: Acer Peripherals, Inc., Tayoyuan, Taiwan

[21] Appl. No.: 822,913

[22] Filed: Mar. 21, 1997

Related U.S. Application Data

[63] Continuation-in-part of Ser. No. 645,384, May 13, 1996, abandoned.

[51] Int. Cl.$^6$ ................................................ H01J 29/70
[52] U.S. Cl. ................................................ 315/411; 348/730
[58] Field of Search ................................ 315/411; 348/730

[56] References Cited

U.S. PATENT DOCUMENTS 4,692,669  9/1987  Black et al. ........................ 315/381
5,459,378  10/1995 Kato et al. ........................ 315/382.1
5,463,288  10/1995 George et al. ..................... 315/382

*Primary Examiner*—Theodore M. Blum
*Attorney, Agent, or Firm*—Meltzer, Lippe, Goldstein, et al.

[57] ABSTRACT

A circuit for generating a screen voltage is provided. The circuit employs an operational amplifier and two NPN transistors and receives an analog control signal from a microprocessor. The analog control signal is input to the negative input terminal of the operational amplifier. The output screen voltage is taken at emitter of one NPN transistor. In one preferred embodiment, Vcc is taken at a primary side of a high voltage transformer within the display device and input to the collector of the one NPN transistor.

3 Claims, 1 Drawing Sheet

MICROPROCESSOR-CONTROLLED SCREEN VOLTAGE GENERATION CIRCUIT

This is a continuation-in-part of U.S. patent application Ser. No. 08/645,384, filed May 13, 1996 of Chang-Fa HSIESH for MICROPROCESSOR-CONTROLLED SCREEN VOLTAGE GENERATION CIRCUIT, now abandoned.

TECHNICAL FIELD OF INVENTION

This invention relates to the generation of screen voltage within a display device, i.e. monitor or television.

BACKGROUND OF INVENTION

A flyback transformer is generally implemented within the circuit of a display device for providing distinctive voltages, i.e. High voltage, Focus voltage and Screen voltage, required by the circuit operation of the display device. It is well known the Screen voltage is input to the Screen electrode (G2) of cathode ray tube for color adjustment. Some U.S. Pat. Nos., i.e. 5,160,872, 5,287,479 and 4,144,480 may be referred to have an understanding of structures of flyback transformer, the generation and adjustment of the screen voltage.

To vary the output value of the screen voltage from the flyback transformer, one has to adjust the variable resistor within the focus pack which is not made possible by control of a microprocessor. It is well known that once a resistance value is selected in the variable resistor on the manufacturing site, the operator has to apply a glue material thereon for securing the selective value. The glue material requires stable chemical properties under design environment to avoid the unexpected change of resistance value. Even small amount of variance in its chemical property would result in looseness of the variable resistor during transportation.

To avoid the drawback of using the glue material aforementioned, the instant invention provides a Screen voltage generation circuit which dispense with the use of glue material.

To take advantage of a microprocessor, the instant invention provides a circuit for generating a Screen voltage whose value varies in response to an analog control signal from the microprocessor.

SUMMARY OF INVENTION

A circuit for generating a screen voltage comprises an operational amplifier, a first NPN transistor and a second NPN transistor.

The operational amplifier has a negative input terminal receiving an analog control signal, a positive input terminal and an output terminal.

The first NPN transistor has a base, a collector and an emitter. The collector is coupled to a Vcc voltage, the collector and base are coupled together via a first resistor. The screen voltage is generated at the emitter of the first NPN transistor and coupled to the positive input terminal of the operational amplifier.

The second NPN transistor has a base, a collector and an emitter. The base is coupled to the output terminal of the operational amplifier. The collector is coupled to the base of the first NPN transistor.

Without the need of the glue material for securing a selective resistance value in the variable resistor conventionally used, the present invention makes high reliability of a display device possible.

DETAILED DESCRIPTION OF THE INVENTION

Figure 1:
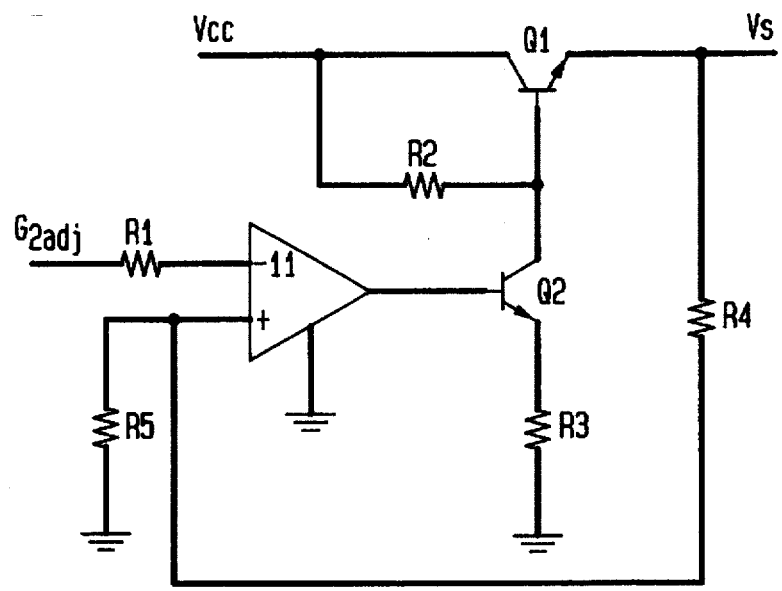
FIG. 1 illustrates the invention.

As illustrated in FIG. 1, the invention includes an operational amplifier 11, a first NPN transistor Q1, a second NPN transistor Q2. The negative input of the operational amplifier 11 receives an analog control signal $G_{2adj}$ which is output from DAC pin of a microprocessor (not shown). In a typical application, the range of the analog control signal $G_{2adj}$ varies from 0.6 volts to 5.0 volts. The collector of first transistor Q1 is coupled to a Vcc retrieved from other circuits of the display device. The value of Vcc ranges from 900 volts to 1200 volts in a typical display device. In one preferred embodiment, Vcc is taken at a primary side of a high voltage transformer within the display device. The output of the operational amplifier 11 is input to the base of the second NPN transistor Q2. The screen voltage V, is taken at the emitter of the first NPN transistor Q1 and coupled to the positive input of the operational amplifier 11 via a resistor R4. The base and the collector of the first NPN transistor Q1 is coupled together via a resistor R2. The maximum output value of screen voltage $V_s$ at the emitter of the first NPN transistor Q1 is determined by ratio of R4/R5. The minimum output value of screen voltage $V_s$ is determined by ratio of R2/R3. In the following numerical illustration, it is assumed that R4/R5=140, R2/R3=50 and Vcc=1200 volts.

As the analog control signal $G_{2adj}$ is 5 volts, the first and second NPN transistors Q1, Q2 are turned ON. The voltage drop across R2 is less than 500 volts. Due to the tracking capability of positive and negative inputs of an ideal operational amplifier, the maximum output screen voltage $V_s$ is 705 volts which is equal to $G_{2adj}+(R4/R5)* G_{2adj}°$.

As the analog control signal $G_{2adj}$ is 0.6 volts, the operational amplifier 11 saturates and has its maximum output value of 18.8 volts. The operational amplifier 11 does not behave as an ideal operational amplifier. The first and second NPN transistors Q1, Q2 are turned on. The voltage difference between base and emitter terminals at this state is 0.65 volts for both the first and second NPN transistors. Applying the current law across R2 and R3, it is found the minimum output screen voltage $V_s$ is 292.5 volts which is equal to Vcc−(R2/R3) * (18.8−0.65). The voltage drop across R2 is 907.5 volts.

Therefore, the output screen voltage may vary substantially between 300 volts and 700 volts responsive to the analog control signal $G_{2adj}$ for the embodiment reiterated above.

Figure 2:
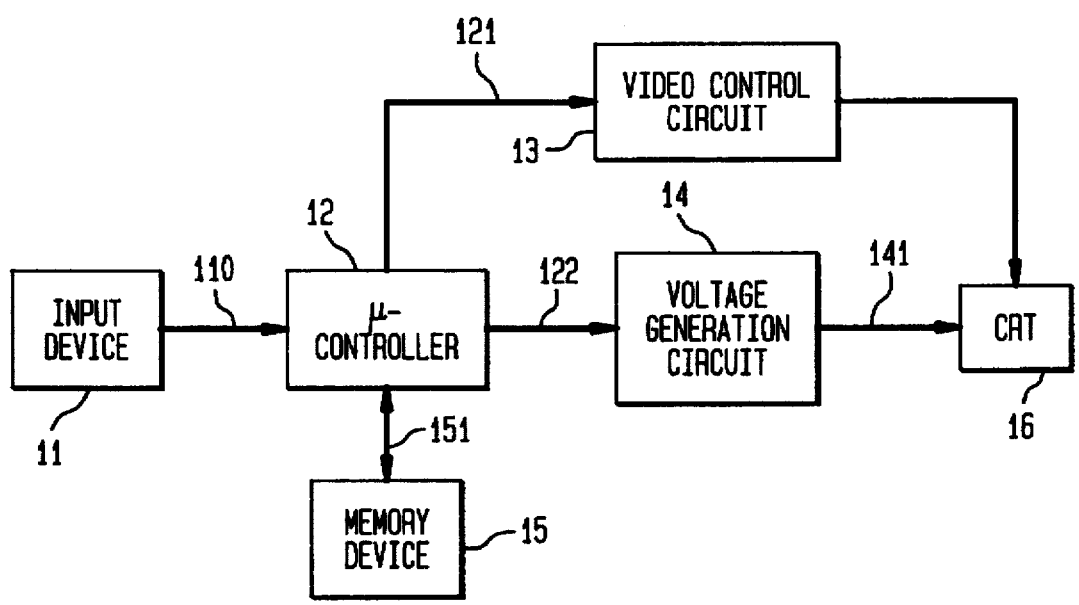
FIG. 2 illustrates the a display device employing the instant invention.

As shown in FIG. 2, the display system incorporating. the invention shown in FIG. 1, comprises input device 11, a microcontroller device 12, a memory device 15, a video control circuitry 13, a screen voltage generation circuit 14 and the cathode ray tube 16.

The input device 11 receives an adjustment instruction from the user of the display device. In one embodiment, the input device includes a digital button on the front panel of the display device.

The microcontroller device 12 is responsive to the adjustment instruction 110 and generates an analog control signal 122. The ways by which the microcontroller device 12 generates the analog control signal 122 or digital control signal 121 are predetermined and instructed by the programs stored in the memory device 15.

The memory device 15 is coupled to the microcontroller device 12 and stores programs which instruct the microcontroller device 12 how to control the operation or parameter adjustment of display device via the aid of the video control circuit 13 and the screen voltage generation circuit 14.

The screen voltage generation circuit 14 is responsive to the analog control signal 122 for generating a screen voltage signal 141 to the G2 terminal of the cathode ray tube as well known in the arts. It is most advantageous to employ the present invention within a digitally-controlled display device which already has non-volatile memory, i.e. EEPROM, processor unit therein.

I claim:

1. A circuit for generating a screen voltage, comprising:
   an operational amplifier, the operational amplifier having a negative input terminal receiving an analog control signal, a positive input terminal and an output terminal;
   a first NPN transistor having a base, a collector and an emitter, the collector is coupled to a Vcc voltage, the collector and base being coupled together via a first resistor, the screen voltage being generated at the emitter and coupled to the positive input terminal of the operational amplifier;
   a second NPN transistor having a base, a collector and an emitter, the base being coupled to the output terminal of the operational amplifier, the collector being coupled to the base of the first NPN transistor.

2. A display device, the display device including a high voltage transformer, comprising:
   input means receiving an adjustment instruction;
   microcontroller means, responsive to said adjustment instruction, generating an analog control signal;
   memory means coupled to the microcontroller means for storing a program executed by the microcontroller means; and
   electronic adjustment means, responsive to the analog control signal, for generating a screen voltage signal using a power supply from a primary side of the high voltage transformer.

3. The display device as recited in claim 2, wherein the screen voltage generation means comprises:
   an operational amplifier, the operational amplifier having a negative input terminal receiving said analog control signal, a positive input terminal and an output. terminal;
   a first NPN transistor having a base, a collector and an emitter, the collector is coupled to a Vcc voltage, the collector and base being coupled together via a first resistor, the screen voltage being generated at the emitter and coupled to the positive input terminal of the operational amplifier;
   a second NPN transistor having a base, a collector and an emitter, the base being coupled to the output terminal of the operational amplifier, the collector being coupled to the base of the first NPN transistor.

* * * * *